(12) United States Patent
Pelekhaty et al.

(10) Patent No.: US 7,433,559 B1
(45) Date of Patent: Oct. 7, 2008

(54) TEMPERATURE-COMPENSATED GRATING PACKAGE AND METHOD OF MAKING THE SAME

(75) Inventors: Vladimire Pelekhaty, Baltimore, MD (US); Carl Gaebe, Ellicott City, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/494,063

(22) Filed: Jan. 28, 2000

(51) Int. Cl.
*G02B 6/34* (2006.01)
(52) U.S. Cl. ....................................................... 385/37
(58) Field of Classification Search ................... 385/37, 385/31, 15, 13, 147
See application file for complete search history.

(56) References Cited

U.S. PATENT DOCUMENTS

| | | | | |
|---|---|---|---|---|
| 5,694,503 | A * | 12/1997 | Fleming et al. | 385/37 |
| 5,841,920 | A * | 11/1998 | Lemaire et al. | 385/37 |
| 5,987,200 | A * | 11/1999 | Fleming et al. | 385/37 |
| 6,101,301 | A * | 8/2000 | Engelberth et al. | 385/37 |
| 6,147,341 | A * | 11/2000 | Lemaire et al. | 250/227.17 |
| 6,148,128 | A * | 11/2000 | Jin et al. | 385/37 |
| 6,175,674 | B1 * | 1/2001 | Lin | 385/37 |
| 6,181,851 | B1 * | 1/2001 | Pan et al. | 385/37 |

* cited by examiner

*Primary Examiner*—Hemang Sanghavi
*Assistant Examiner*—Scott A Knauss
(74) *Attorney, Agent, or Firm*—David L. Soltz; Michael R. Cammarata

(57) ABSTRACT

A temperature-compensated fiber grating package which provides a temperature dependant stress on a fiber Bragg grating to substantially compensate for temperature dependant variations of the Bragg wavelength. The package includes a base, a fiber grating bonded to the base, and a strut. The base is formed from a high thermal expansion material, and includes first and second spaced arms separated by a base portion. The strut is constructed from a low thermal expansion material is disposed between the first and second arms. The ends of the strut engage the interior surfaces of the arms to form left and right fulcrum points. The fiber grating is secured between the first and second arms. As temperature increases, the high thermal expansion material of the arms expands at a greater rate than the low thermal expansion material of the strut. The top portion of at least one of the arms thus pivots inward about a fulcrum point to place the temperature-dependant negative strain on the grating. The strain rate may be adjusted by appropriate positioning of the fulcrum points. According to another aspect of the invention a hinge may be provided adjacent one of the arms to substantially restrict flexing to that arm, thereby allowing adjustment of the compensating strain rate as well as an initial bias strain. According to another aspect of the invention, compensation for second order Bragg wavelength variations may be achieved by providing one of the arms with an inwardly extending angular top portion. Methods of making a temperature-compensated grating package consistent with the invention are also disclosed.

22 Claims, 4 Drawing Sheets

TEMPERATURE-COMPENSATED GRATING PACKAGE AND METHOD OF MAKING THE SAME

FIELD OF THE INVENTION

The present invention relates in general to optical filters, and in particular to a temperature-compensated fiber grating package for use in wavelength division multiplexed optical communication systems.

BACKGROUND OF THE INVENTION

Fiber Bragg gratings (hereinafter referred to also as "fiber gratings" or simply "gratings") are well known and widely used in a variety of optical applications. In general, a fiber grating is formed by providing a periodic variation in the refractive index of the core of an optical fiber. The periodic variations or gratings in the fiber core cause reflection of a particular Bragg wavelength given by $\lambda_B = 2n\Lambda$, where n is the mean refractive index of the grating, and $\Lambda$ is the grating period. All other incident wavelengths are transmitted through the grating.

Thus, it is well known that by choice of n and $\Lambda$, a fiber grating may be effectively utilized as an optical filter for filtering a desired wavelength from an optical signal. In fact, due to their narrow passband and relatively inexpensive cost to produce, fiber gratings have developed as key components of many fiber optic communication systems where wavelength or channel selection is critical. Fiber gratings are widely used, for example, for channel selection in wavelength division multiplexed (WDM) or dense wavelength division multiplexed (WDM) communication systems, wherein a plurality of distinct optical wavelengths or channels are multiplexed and propagated over an optical medium to a plurality of receivers. In these systems, the channels or wavelengths chosen for transmission, as well as the channel spacings, are selected to correspond to an International Telecommunication Union (ITU) channel grid, wherein channel spacing may be, for example, 50 or 100 GHz. Reliable selection of a particular ITU channel from a WDM signal is essential to proper functionality of a WDM system.

One difficulty associated with the use of fiber gratings for channel selection relates to the temperature dependence of $\Lambda$ and n. Variations of $\Lambda$ or n result in corresponding variations in the Bragg wavelength. In a typical fiber grating formed from germania doped fused silica fiber, the temperature dependance of the Bragg wavelength is dominated by the temperature variation of n, and may be approximately 0.0115 nm/° C. or approximately 1.44 GHz/° C. at a wavelength of 1550 nm. This translates to a wavelength variation of approximately 100 GHz over a 70° C. operating temperature range. In a WDM or DWDM communication system with a channel separation of 50 or even 100 GHz, this temperature variation is clearly problematic.

Several fiber grating temperature compensation schemes have been proposed and attempted. One approach has been to provide an external heat source which includes electronics for providing thermal stabilization of the grating. Such heat sources and associated temperature-control circuitry, however, add significant costs, increase system complexity and consume power.

Accordingly, there have been several attempts to provide a temperature-dependant compensating strain to the fiber grating. Gratings of this type are generally referred to as temperature-compensated gratings, and generally do not require thermal stabilization, i.e., from an external heat source. Some common temperature-compensated grating schemes utilize re-entrant tubes or other structures made from materials with dissimilar thermal expansion characteristics, bimetallic strips, or negative thermal-expansion ceramics. To date, however, each of the known approaches to providing a temperature-compensated grating have failed to provide a sufficiently reliable and cost-effective device.

Accordingly, there is a need in the art for a temperature-compensated grating package which provides reliable compensation for the temperature dependency of the Bragg wavelength. There is a further need in the art for a temperature-compensated grating package which may be efficiently and cost-effectively produced.

SUMMARY OF THE INVENTION

The present invention is organized about the concept of providing a temperature-compensated grating package which includes a base portion and a strut for providing a negative temperature-dependant strain on the grating to substantially compensate for temperature-dependant variations of the Bragg wavelength of the grating. The base portion is formed from a high thermal expansion material, and includes first and second spaced arms or arm extending therefrom. The strut is constructed from a low thermal expansion material, and is disposed between the first and second arms. The ends of the strut engage the interior surfaces of the arms to form left and right fulcrum points. First and second ends of the fiber grating are bonded to the top portions of the first and second arms, respectively.

The fiber grating is typically pre-stressed with a positive bias strain to have a desired Bragg wavelength. As temperature increases, the high thermal expansion material of the base portion expands at a greater rate than the low thermal expansion material of the strut. The top portion of at least one of the arms thus pivots inward about one of the fulcrum points to impart a temperature-dependant negative strain on the grating. The strain rate may be adjusted by appropriate positioning of the fulcrum points.

In one exemplary embodiment, a hinge is provided adjacent one of the base arms to substantially restrict flexing to that arm. In this embodiment, the negative strain rate may be adjusted by varying the fulcrum point adjacent the hinge, while the positive bias strain may be adjusted by varying the position of the opposite fulcrum point. In another exemplary embodiment, non-linear, e.g., circular, motion in one of the arms may be provided to compensate for second order Bragg wavelength variations. This may be achieved, for example, by providing one of the arms with an inwardly extending angular top portion. One end of the fiber grating is attached to the inwardly extending top portion and the other end of the grating is attached to the top portion of the other arm.

More particularly, a temperature-compensated grating package consistent with the invention includes: a base portion having first and second spaced arms including a first material having a first coefficient of thermal expansion; a strut including a second material having a second coefficient of thermal expansion less than the first coefficient of thermal expansion and disposed between the first and second arms; and an optical fiber having a Bragg grating formed therein and having a first portion affixed to the first arm and a second portion affixed to the second arm so that the grating is disposed between the arms. The fiber may be affixed to the arms using, for example, an epoxy, solder, a weld, etc. The strut has a first end in contact with an interior surface of the first arm to define a first fulcrum point and a second end in contact with an interior surface of the second arm to define a second fulcrum point. Advantageously, upon an increase in ambient temperature, due to differing positive coefficients of thermal expansion, the base portion, including the arms, expand at a rate greater than that of the strut. At least one of the arms thereby flexes about at least one of the fulcrum points to provide a temperature-dependant, axial strain on the fiber to substantially compensate for temperature-dependant variations of the Bragg wavelength of the grating.

The first and second arms of the base portion may be spaced from one another and extend upwardly relative to a top surface of the base portion. Also, the base may be integrally formed from the first material. Exemplary materials which may be utilized as a first, i.e., high thermal expansion, material consistent with the invention include BeCu and 316-SS. The second, i.e., low thermal expansion, material may be, for example, Invar.

Advantageously, a compensating axial strain is imparted to the fiber using materials having positive coefficients of thermal expansion. The axial strain may be adjusted by varying the positions of the fulcrum points. This may be accomplished iteratively through experimentation to achieve a desired axial stress which provides sufficient temperature stabilization of the Bragg wavelength for the grating. The fulcrum points necessary to achieve a desired axial strain may also be approximated consistent with equations 1 or 2 set forth below.

According to another aspect of the invention, the base may further include portions defining a hinge adjacent a bottom of the first arm. The hinge tends to substantially limit flexing in the structure to the first arm. Thus, the first fulcrum point may be adjusted to achieve an approximate axial strain consistent with equations 1 or 2, below, while the second fulcrum point may be adjusted to vary an initial positive bias strain on the fiber.

According to another aspect of the invention, the first arm may be provided with an angular top portion extending inwardly and upwardly relative to a top of the second arm. The first end of the fiber is bonded to the angular top portion, and the second end of the fiber is bonded to the second arm. The angular top portion allows for second order corrections of the Bragg wavelength.

In one exemplary method of making a temperature compensated grating package consistent with the invention, the package is assembled prior to forming the grating in the fiber. The grating is subsequently written into the pre-stressed fiber.

According to another exemplary method of making a package consistent with the invention, the base, the strut, and the Bragg grating are heated to a temperature above an intended use temperature of the package to provide a Bragg wavelength of the Bragg grating which is at least substantially equivalent to a desired Bragg wavelength. The optical fiber is then affixed to the base arms with the Bragg grating disposed between the first and second arms while maintaining the temperature of the base, the strut, and the Bragg grating. The base, the strut, and the Bragg grating are then allowed to cool, thereby establishing an axial stress on the fiber.

According to another exemplary method of making a package consistent with the invention, the package is assembled and the base, the bonding material holding the fiber to the arms, the strut, and the fiber is heated to achieve stress relaxation in the Bragg grating. The heated portion(s) of the assembly is allowed to cool, and the heating and cooling steps are repeated until a desired Bragg wavelength of the Bragg grating is observed.

BRIEF DESCRIPTION OF THE DRAWING

For a better understanding of the present invention, together with other objects, features and advantages, reference should be made to the following detailed description which should be read in conjunction with the following figures wherein like numerals represent like parts.

DETAILED DESCRIPTION OF THE INVENTION

Figure 1:
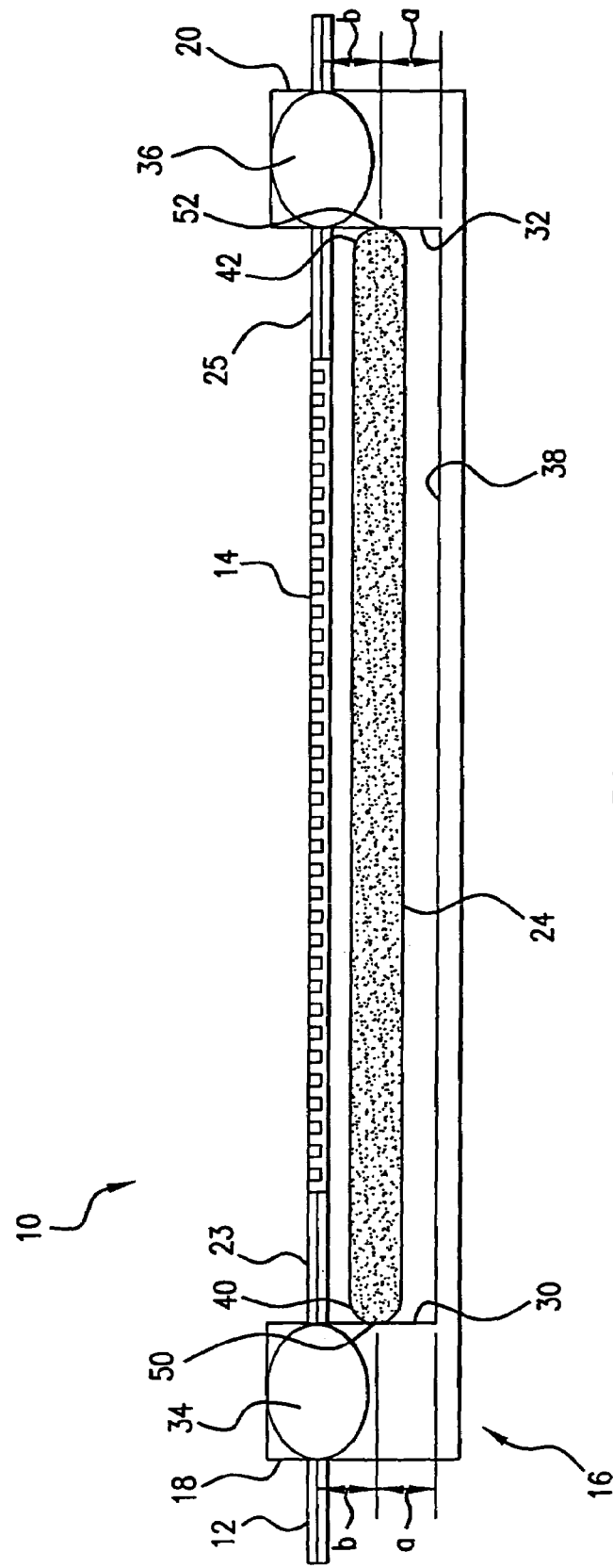
FIG. 1: is a side-view schematic illustration of an exemplary temperature-compensated fiber Bragg grating consistent with the present invention.

FIG. 1 illustrates an exemplary temperature-compensated grating package 10 consistent with the invention. As shown, the exemplary package includes an optical fiber 12, with a Bragg grating 14 formed therein, secured to a base 16. Those skilled in the art will recognize that the fiber and the fiber grating have been depicted in highly simplified form. Typically, an optical fiber includes a fiber cladding surrounding a fiber core, which may be, for example, germania doped fused silica. The grating includes a portion of the fiber having periodic variations in the refractive index of the core. As will be recognized by those skilled in the art, the grating 14 reflects a significant portion of an optical signal traveling on the fiber 12 at wavelengths in a very narrow range around a center or Bragg wavelength, $\lambda_B=2n\Lambda$, as discussed above. Substantially all other wavelengths are transmitted through the grating.

The Bragg wavelength varies with temperature due to the temperature dependency of $\Lambda$ and n, as discussed above. In accordance with the invention, however, the longitudinal strains in the grating attributable to temperature variations of $\Lambda$, as well as refractive index n, are substantially compensated for by the compensating package 10. Advantageously, the base is constructed from materials having positive coefficients of thermal expansion, and is adapted for providing a temperature-dependant negative longitudinal strain on the grating.

In the exemplary embodiment shown in FIG. 1, compensating package 10 includes a base portion 16 having first 18 and second 20 arms extending upwardly therefrom (as depicted in FIG. 1), and a strut 24 disposed between the first and second arms 18 and 20. Portion 23 of the fiber adjacent a first end of the grating is bonded to a side surface 30 of first arm 18, and a portion 25 of the fiber adjacent a second end of the grating is bonded or otherwise secured to a side surface 32 of the second arm 20. The grating 14 is thus secured between the arms 18,20 in a substantially perpendicular relationship to the interior surfaces 30,32 of the arms by first 34 and second 36 bonds. A variety of bonding materials, e.g., epoxy, for forming the bonds 34,36 will be apparent to those skilled in the art. For long-term stability, however, stress-induced epoxy flow may be problematic in an embodiment with epoxy bonds. Thus, bonding using solder or a weld may be preferable for achieving long-term performance.

In the illustrated embodiment, with the grating secured between the arms, the strut 24 is disposed between surface 38 of the arm base 22 and the grating 14. The strut may have a uniform dimension throughout its length and may have radiused ends 40,42, as shown. As will be described in detail below, the strut 24 acts as a fulcrum by contact of the ends of the strut with the interior surfaces 30,32 of the arms.

To achieve a temperature-dependant negative strain on the grating, arms 18,20 of base 16 are formed from a high thermal expansion material and the strut 24 is formed from a low thermal expansion material. It is to be understood that the terms "high thermal expansion material" and "low thermal expansion material" are used herein to indicate a relative difference in the thermal expansion coefficients for the materials, and do not necessarily indicate a particular range of thermal expansion coefficients. Thus, the high thermal expansion material need only exhibit a higher rate of thermal expansion compared to the low thermal expansion material.

Consistent with the invention, even a small difference between the coefficients of thermal expansion will result in the application of a negative strain on the grating, and would provide utility depending on the intended application, the grating material, temperature range, cost and performance considerations, etc. It has been found, however, that for a grating formed in a germania doped fused silica fiber core, the ideal strain on the grating should be about $-9.2$ microstrains/°C. This strain may be approximated using BeCu or 316-SS, for example, as the high thermal expansion material for the base, including the arms, and Invar, for example, as the low thermal expansion material for the strut. Those skilled in the art will, however, recognize that a variety of high and low thermal expansion materials may be used to achieve a desired strain rate.

With continued reference to FIG. 1, at room temperature, the strut 24 may be slightly oversized compared to the distance between the interior surfaces 30, 32 of the arms, thereby causing the arms 18,20 to spread slightly and resulting in a positive bias strain on the grating 14. As temperature increases, base 16 expands faster than the strut 24 due to the differences in the coefficients of thermal expansion. The interior surfaces 30,32 of the arms are therefore forced against the ends of the strut. The points of contact between the strut 24 and the interior surfaces 30, 32 of the arms define first 50 and second 52 fulcrum points. The arms tend to pivot about the fulcrum points 50,52, with the areas of the arms to which the grating 14 is bonded tending to rotate inward to place a negative strain on the grating 14.

The initial bias strain on the grating directly affects the center or Bragg wavelength of the grating, and should be chosen to appropriately tune the Bragg wavelength to a desired wavelength, e.g., a specific ITU channel. The bias strain may be provided during fabrication of the package 10 using a variety of methods. In one exemplary method according to the invention, assembly of the package may be completed, i.e., with the slight bias strain caused by engagement of the ends of the strut 24 with the arms 18,20, prior to forming the grating 14. The grating 14 may then be written into the fiber 12 at room temperature with the fiber 12 mounted to the base.

A variety of manners for forming the grating are well known to those skilled in the art. For example, the grating 14 may be formed directing a light source formed by two interfering sources of UV light onto portions of the fiber 12. The light source varies the index of refraction of the fiber to form the gratings while the reflected Bragg wavelength of the fiber is monitored. Once the desired Bragg wavelength is achieved, the light source is removed.

In another exemplary method of establishing a bias strain in the fiber according to the invention, base 16, strut 24, and the grating 14 are heated to a temperature above the intended use temperature of the package prior to mounting of the grating 14 to base 16. While monitoring the Bragg wavelength of the grating, the temperature may be adjusted until the desired Bragg wavelength is achieved. Small corrections in the Bragg wavelength resulting from cooling of the fiber may be anticipated by observing an initial Bragg wavelength in the heated grating which is slightly different from the desired Bragg wavelength. The base, strut, and grating are maintained at the appropriate temperature for achieving the desired Bragg wavelength during attachment of the grating to the base. When the assembled package cools, a temperature-related tensile stress is applied to the grating so that the grating exhibits the desired Bragg wavelength.

In another exemplary method of establishing a biasing strain according to the invention, a package according to the invention is initially constructed with a grating 14 having an initial Bragg wavelength which is greater than a desired Bragg wavelength. Subsequently, while monitoring the Bragg wavelength, the fiber is heated adjacent the portions 23, 25 outside of the grating, but within the stressed regions of the fiber. The heating process is controlled with respect to time and temperature to produce a temporary softening of the fiber and, therefore, a controlled fiber stress relaxation. The heating process may be repeated incrementally until the desired Bragg wavelength is achieved. Adjustment of the Bragg wavelength according to this method may also be achieved by heating the bonding material, e.g., epoxy, solder, weld, etc., which creates the bonds 34,36 between the fiber and the arms 18,20. Alternatively, the method may be applied to relax a portion of the base 16 or strut 24 which is remote from the fiber. Combinations of the base, strut, bonding material, and fiber may also be relaxed to achieve the desired Bragg wavelength.

The rate of strain compensation, i.e., the rate of temperature-dependant negative strain on the grating, is substantially dependant on the position of the fulcrum points 50,52, as defined by the contact points between the strut and the arm. The fulcrum points 50, 52 may be varied iteratively until a strain rate is achieved which provides sufficient temperature stabilization of the Bragg wavelength for the grating. However, appropriate positioning of the fulcrum points may also be determined by examining mathematical representations of the desired strain rate on the grating. For example, with continued reference to FIG. 1, the temperature-dependent strain rate on the grating 14 is a function of the thermal expansion of the strut, the thermal expansion of the arms, and the fulcrum points 50, 52, and may be expressed as:

$$C(T) = f[A(T), B(T), b, a] = B(T) + [B(T) - A(T)]\frac{b}{a}$$

wherein C is the length of the grating, B is the length of the strut 24, A is the distance between the interior surfaces 30, 32 of the arms (i.e., the length of the base between the arms), b (see FIG. 1) is the distance from the centerline of the grating to the fulcrum points 50,52, and a (see FIG. 1) is the distance from the bottom of the arms, e.g., the top surface 38 of the arm base, to the fulcrum points 50,52. The change in C with respect to temperature may be expressed as:

$$\frac{dC}{dT} = \frac{\partial C}{\partial B}\bigg|_{B0} \frac{dB}{dT} + \frac{\partial C}{\partial B}\bigg|_{A0} \frac{dA}{dT}$$

and, $$\frac{dC}{dT} = \left(1 + \frac{b}{a}\right)\frac{dB}{dT} - \frac{b}{a}\frac{dA}{dT}$$

$$\frac{dB}{dT} = \alpha_B B_0 \quad \frac{dA}{dT} = \alpha_A A_0$$

where $B_0$ is the length the strut 24 at room temperature, and $A_0$ is the distance between the interior surfaces 30, 32 of the arms at room temperature, $\alpha_B$ is thermal expansion coefficient for the strut material, and $\alpha_A$ is the thermal expansion coefficient for the arm material. Substituting equations gives:

$$\frac{dC}{dT} = \left(1 + \frac{b}{a}\right)\alpha_B B_0 - \frac{b}{a}\alpha_A A_0$$

and, $$C(T) = C_0 + \left[\left(1 + \frac{b}{a}\right)\alpha_B B_0 - \frac{b}{a}\alpha_A A_0\right](T - T_0)$$

where $C_0$ is the length of the grating 14 at room temperature, and $T_0$ is room temperature. The strain on the fiber as a function of temperature (T) may be represented as:

$$\text{fiber strain} = \sigma c(T) = \frac{dC}{C_0}.$$

Substituting equations gives:

$$\sigma c(T) = \left[\left(1 + \frac{b}{a}\right)\alpha_B \frac{B_0}{C_0} - \frac{b}{a}\alpha_A \frac{A_0}{C_0}\right](T - T_0) \quad \text{(Equation 1)}$$

If $A_0$, $B_0$, and $C_0$ are equal, then $$\sigma c(T) = \left(1 + \frac{b}{a}\right)\alpha_B - \frac{b}{a}\alpha_A = \alpha_B + \frac{b}{a}(\alpha_B - \alpha_A) \quad \text{(Equation 2)}$$

and, $$\frac{b}{a} = \frac{\sigma c(T) - \alpha_B}{(\alpha_B - \alpha_A)}$$

In the case where the arms 18, 20 are constructed from the material 316-SS and the strut 24 is constructed from Invar 36, $\alpha_A$ is $18.5 \times 10^{-6}$/° C. and $\alpha_B$ is $1.35 \times 10^{-6}$/° C. Substituting these values into Equation 2 to achieve a fiber strain, $\sigma c(T)$ of $-9.2 \times 10^{-6}$/° C. gives:

$$\frac{b}{a} = \frac{(-9.2 \times 10^{-6} - 1.35 \times 10^{-6})}{(1.35 \times 10^{-6} - 18.5 \times 10^{-6})} = 0.615$$

Thus, for an Invar strut and 316-SS arms, a compensating negative strain on the grating of $-9.2 \times 10^{-6}$/° C. may be provided by positioning the fulcrum points 50, 52 of the strut such that the ratio of b to a is approximately 0.615, for example. From equations 1 and 2, however, those skilled in the art will recognize that a wide variety of high and low thermal expansion materials may be utilized to achieve a particular desired strain rate, even in an embodiment where $A_0$, $B_0$, and $C_0$ are not equal.

Figure 2:
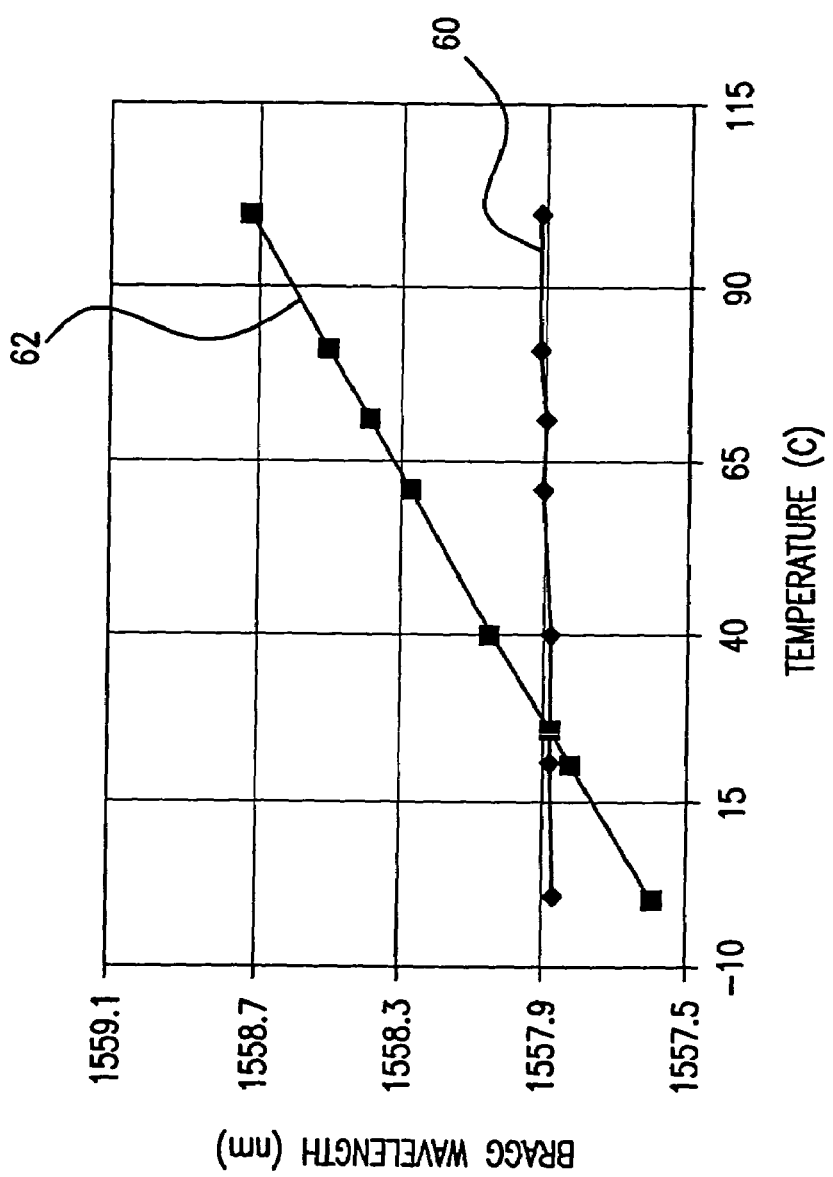
FIG. 2: is an illustration of an exemplary plot of Bragg wavelength vs. temperature for an exemplary temperature-compensated fiber Bragg grating consistent with the present invention along with an exemplary plot of Bragg wavelength vs. temperature for an uncompensated grating.

Turning now to FIG. 2, there is illustrated an exemplary plot 60 of Bragg wavelength vs. temperature for the exemplary embodiment depicted in FIG. 1, wherein the arms 18,20 are formed from 316-SS and the strut 24 is constructed from Invar and positioned to achieve a compensating negative strain on the grating of $-9.2 \times 10^{-6}$/° C. Also illustrated is an exemplary plot 62 of Bragg wavelength vs. temperature for an exemplary uncompensated fiber Bragg grating. As shown, the exemplary package 10 consistent with the invention provides a relatively stable Bragg wavelength which varies from about 1557.88 nm to about 1557.92 nm, or about 4.9 GHz, over a temperature range of at least about 100° C. In contrast, the Bragg wavelength of the uncompensated the grating varies from about 1557.55 nm to about 1558.75 nm, or about 148 GHz, over the same temperature range. In WDM or DWDM systems with a channel separation of 50 or 100 GHz, relatively slight temperature-related variations of the Bragg wavelength of a grating in a temperature-compensated package consistent with the invention are well within acceptable limits, whereas significant temperature-related variations of the Bragg wavelength of an uncompensated grating render such gratings unsuitable for these applications.

Figure 3:
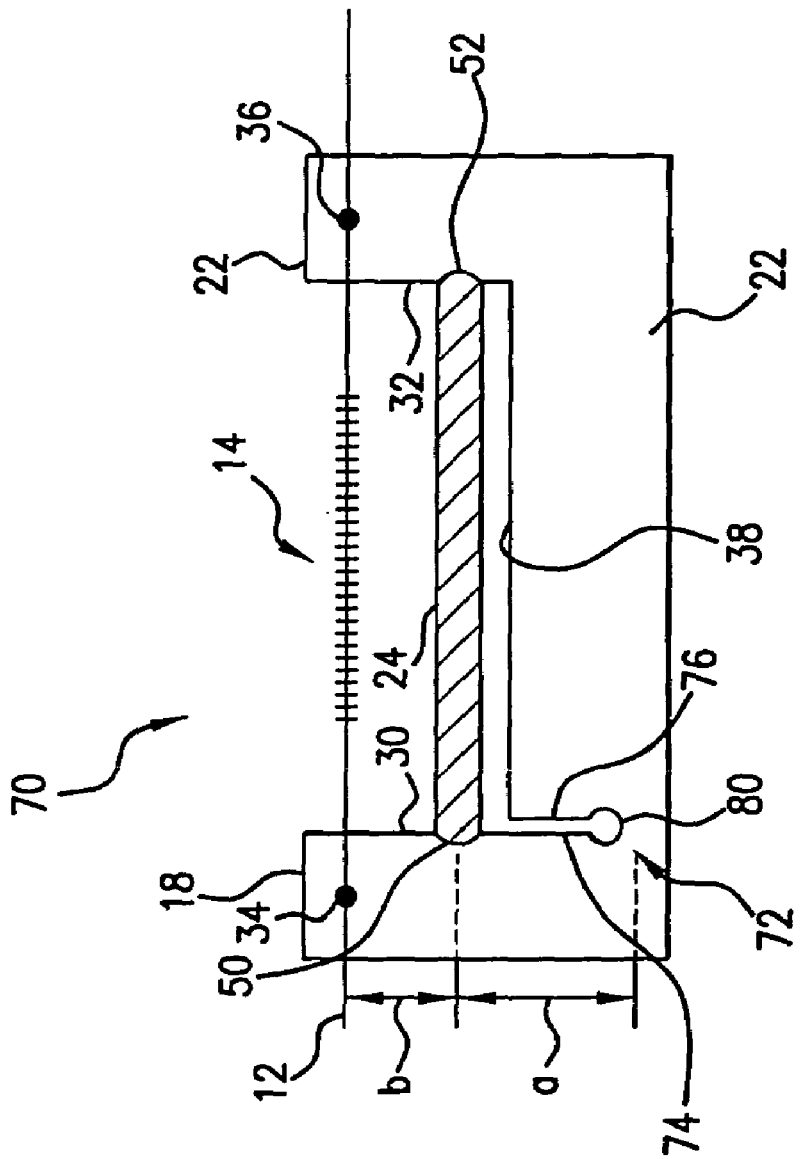
FIG. 3: is a side-view schematic illustration of another exemplary embodiment of a temperature-compensated fiber Bragg grating consistent with the present invention.

Turning now to FIG. 3, there is shown another exemplary embodiment 70 of a temperature-compensated grating package consistent with the present invention. The illustrated embodiment is substantially similar to the embodiment depicted in FIG. 1, with the exception that a hinge 72 is provided below the fulcrum at one end of the strut 24, e.g., the left fulcrum 50 in FIG. 3. Those skilled in the art will recognize a variety of manners in which the hinge may be constructed. For example, the base 16 may be molded as an integral structure, and portions beneath an end of the strut defining hinge. The structure could also be formed without the hinge, with the hinge being cut into the structure thereafter.

In the illustrated embodiment the hinge includes a top portion defining a first side wall 74 in alignment with the interior surface 30 of the arm and an opposed second side wall 76 formed in the base portion. Also, a generally circular bottom portion of the hinge is defined by an arcuate portion 80 formed in a bottom portion of base 16. It is to be understood, however, that a variety of geometries for the hinge may be provided. For example, the top portion may be eliminated and/or the bottom portion may be generally oval, rectangular, etc., or may merely comprise a continuance of the top portion of the hinge.

Advantageously, the hinge 72 substantially restricts temperature dependent flexing to the arm adjacent thereto, e.g., the left arm 18 in FIG. 3. Also, the depth of the hinge contributes to the distance a used in equations 1 and 2, as shown in FIG. 3. Thus, in the illustrated embodiment, by adjusting the left fulcrum point 50, the rate of strain relief may be adjusted consistent with equations 1 and 2, above. Once the left fulcrum point 50 is set to achieve a desired strain rate, the right fulcrum point 52 may be moved up or down to adjust the bias strain. In the limit where the strut 24 is long in comparison to the up-down adjustments of the left and right fulcrum points, the bias strain rate may also be tuned independently, as discussed above.

Figure 4:
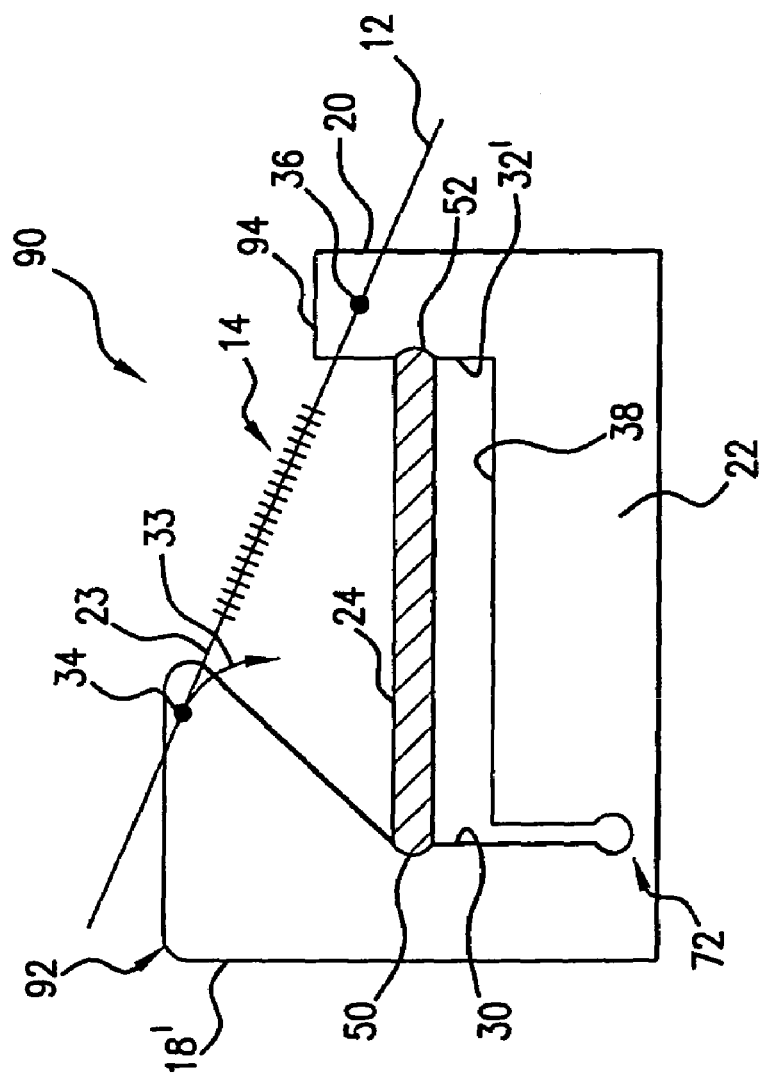
FIG. 4: is a side-view schematic illustration of another exemplary embodiment of a temperature-compensated fiber Bragg grating consistent with the present invention.

Another exemplary embodiment 90 of a temperature-compensated grating package consistent with the invention is illustrated in the FIG. 4. It has been recognized that the temperature-dependant Bragg wavelength exhibits second-order, non-linear temperature variations. Although the second order variations do not significantly impact the total variation over the temperature range of interest in certain WDM or DWDM systems, correction of the second order variations may be desirable in some applications.

Consistent with the present invention, one of the arms may be adapted to flex relative to a fulcrum point with a portion thereof traveling in a non-linear path, e.g., a circular path, to allow for compensation of the second order variations in the temperature-dependant Bragg wavelength. In the exemplary embodiment illustrated in FIG. 4, for example, the arm 18' is provided with an angular top portion 92 which extends inwardly and upwardly relative to the top 94 of the arm 20. In other respects the embodiment of FIG. 4 is similar to the embodiment shown in FIG. 3. As shown, the portion 23 of the fiber adjacent the left end of the fiber grating 14 is bonded to the angular top portion, thereby providing a non-parallel or angular orientation of the grating 14 to the strut 24. As temperature increases, the angular top portion 92 of the left arm pivots relative to the left fulcrum point 50 along a substantially circular path, as indicted, for example, by arrow 33. Due to the angular geometry of the left arm 18', the resulting axial stress on the grating is imposed in a non-linear manner, thereby compensating for second order temperature-dependant variations of the Bragg wavelength.

There is thus provided a temperature-compensated fiber grating which provides a relatively temperature-stabilized Bragg wavelength. Consistent with the invention, an axial stress is placed on a fiber grating by a base and a strut which have positive coefficients of thermal expansion. The axial stress substantially compensates for temperature-dependant Bragg wavelength variations in the grating in an efficient and reliable manner.

The embodiments which have been described herein, however, are but some of the several which utilize this invention and are set forth here by way of illustration but not of limitation. For example, fiber 14 may be attached to the tops of arms 18 and 20 instead of the sides, as discussed above. It is obvious that many other embodiments, which will be readily apparent to those skilled in the art, may be made without departing materially from the spirit and scope of the invention as defined in the appended claims.

What is claimed is:

1. A temperature-compensated fiber grating package comprising:
    a base having first and second spaced arms extending from said base and including a first material having a first coefficient of thermal expansion;
    a strut disposed between and substantially perpendicular to said first and second arms,
    said strut including a second material having a second coefficient of thermal expansion less than said first coefficient of thermal expansion and having a first end in contact with an interior surface of said first arm to define a first fulcrum point, and a second end in contact with an interior surface of said second arm to define a second fulcrum point; and
    an optical fiber having a Bragg grating formed therein, said optical fiber having a first portion adjacent a first end of said Bragg grating being affixed to said first arm and a second portion adjacent a second end of said Bragg grating being affixed to said second arm, said Bragg grating thereby being disposed between said first and second arms, at least one of said first and second arms thereby flexing about at least one of said fulcrum points to provide a temperature-dependent axial stress on said Bragg grating to substantially compensate for temperature-dependant variations of a Bragg wavelength of said Bragg grating.

2. A temperature-compensated grating package according to claim 1, wherein said base portion further includes spaced first and second arms, said first and second arms extending upwardly relative to a top surface of said base portion.

3. A temperature-compensated grating package according to claim 2, wherein said base is integrally formed from said first material.

4. A temperature-compensated grating package according to claim 1, wherein said first material includes one of BeCu and 316-SS.

5. A temperature-compensated grating package according to claim 1, wherein said second material comprises Invar.

6. A temperature-compensated grating package according to claim 1, wherein said first and second fulcrum points are positioned substantially in accordance with:

$$\frac{b}{a} = \frac{\sigma c(T) - \alpha_B}{(\alpha_B - \alpha_A)}$$

wherein b is a distance from each of said fulcrum points to a centerline of said grating, a is a distance from each of said fulcrum points to a bottom of said arms, $\alpha_B$ is said second coefficient of thermal expansion, and $\alpha_A$ is said first coefficient of thermal expansion, and $\sigma c(T)$ is said stress.

7. A temperature-compensated grating package according to claim 1, wherein said first and second portions of said fiber are affixed to said first and second arms, respectively, with an epoxy.

8. A temperature-compensated grating package according to claim 1, wherein said first and second portions of said fiber are affixed to said first and second arms, respectively, with a solder.

9. A temperature-compensated grating package according to claim 1, wherein said first and second portions of said fiber are affixed to said first and second arms, respectively, with a weld.

10. A temperature-compensated grating package according to claim 1, wherein said fiber is affixed to said arms in a substantially parallel relationship to said strut.

11. A temperature-compensated grating package according to claim 1, wherein said base portion includes spaced first and second arms, said first and second arms extending upwardly relative to a top surface of said base portion, said base further comprising portions defining a hinge adjacent a bottom of said first arm.

12. A temperature-compensated grating package according to claim 11, wherein said first fulcrum point is positioned substantially in accordance with:

$$\frac{b}{a} = \frac{\sigma c(T) - \alpha_B}{(\alpha_B - \alpha_A)}$$

wherein b is a distance from each of said fulcrum points to a centerline of said grating, a is a distance from each of said fulcrum points to a bottom of said arms, $\alpha_B$ is said second coefficient of thermal expansion, and $\alpha_A$ is said first coefficient of thermal expansion, and $\sigma c(T)$ is said stress.

13. A temperature-compensated grating package according to claim 11, wherein said strut is adapted in size to allow adjustment of an initial positive bias strain on said grating by varying said second fulcrum point.

14. A temperature-compensated grating package according to claim 1, wherein a portion of said at least one of said first and second arms travels in a non-linear path as said at least one of said first and second arms flexes about said at least one of said fulcrum points.

15. A temperature-compensated grating package according to claim 14, wherein said non-linear path is a circular path.

16. A temperature-compensated grating package according to claim 1, wherein said first arm includes an angular top portion extending inwardly and upwardly relative to a top of said second arm, and wherein said first portion of said fiber is affixed to said angular top portion.

17. A temperature-compensated grating package according to claim 16, wherein at least a portion of said angular top portion travels in a non-linear path as said first arm flexes about said first fulcrum point.

18. A temperature-compensated grating package according to claim 17, wherein said non-linear path is a circular path.

19. A method of making a temperature-compensated grating package comprising:
    providing a base including first and second spaced arms extending from the base and having a first material having a first coefficient of thermal expansion;
    providing a strut substantially perpendicular to and between said first and second arms, said strut having a first end in contact with an interior surface of said first arm to define a first fulcrum point, and a second end in contact with an interior surface of said second arm to define a second fulcrum point, said strut including a second material having a second coefficient of thermal expansion less than said first coefficient of thermal expansion;
    affixing a first portion of an optical fiber to said first arm and a second portion of said optical fiber to said second arm; and
    forming a Bragg grating in said optical fiber between said first and second arms.

20. A method of making a temperature-compensated grating package comprising:
    providing a base including first and second spaced arms extending from the base and having a first material having a first coefficient of thermal expansion;
    providing a strut substantially perpendicular to and between said first and second arms, said strut having a first end in contact with an interior surface of said first arm, and a second end in contact with an interior surface of said second arm, said strut including a second material having a second coefficient of thermal expansion less than said first coefficient of thermal expansion;
    providing an optical fiber with a Bragg grating formed therein;
    heating said base, said strut, and said Bragg grating to a temperature which provides a Bragg wavelength of said Bragg grating which is at least substantially equivalent to a desired Bragg wavelength, said temperature being above an intended use temperature of said package;
    affixing said optical fiber to said base with said Bragg grating disposed between said first and second arms while maintaining said base, said strut, and said Bragg grating at said temperature; and
    cooling said base, said strut and said Bragg grating.

21. A method of making a temperature-compensated grating package comprising:
    providing a base including first and second spaced arms extending from the base and having a first material having a first coefficient of thermal expansion;
    providing a strut substantially perpendicular to and between said first and second arms, said strut having a first end in contact with an interior surface of said first arm, and a second end in contact with an interior surface of said second arm, said strut including a second material having a second coefficient of thermal expansion less than said first coefficient of thermal expansion;
    providing an optical fiber with a Bragg grating formed therein, said Bragg grating having an initial Bragg wavelength which is longer than a desired Bragg wavelength;
    affixing said optical fiber to said first and second arms using a bonding material, said Bragg grating being disposed between said first and second arms;
    heating at least one of said base, said bonding material, said strut, and said fiber to achieve stress relaxation in said Bragg grating;
    allowing said at least one of said base, said bonding material, said strut and said fiber to cool; and
    repeating said heating and cooling steps until said desired Bragg wavelength of said Bragg grating is observed.

22. A method of making a temperature-compensated grating package comprising:
    providing a base including first and second spaced arms extending from the base and having a first material having a first coefficient of thermal expansion;
    providing a strut substantially perpendicular to and between said first and second arms, said strut having a first end in contact with an interior surface of said first arm to define a first fulcrum point, and a second end in contact with an interior surface of said second arm to define a second fulcrum point, said strut including a second material having a second coefficient of thermal expansion less than said first coefficient of thermal expansion;
    providing an optical fiber with a Bragg grating formed therein;
    affixing said optical fiber to said base with said Bragg grating disposed between said first and second arms; and
    positioning at least one of said first and second fulcrum points to allow flexing of at least one of said first and second arms about at least one of said fulcrum points to provide a desired temperature-dependant axial stress on said Bragg grating to substantially compensate for temperature-dependant variations of a Bragg wavelength of said Bragg grating.

* * * * *